United States Patent [19]
Heinrich et al.

[11] Patent Number: 5,549,965
[45] Date of Patent: Aug. 27, 1996

[54] TEXTILE SHEET-LIKE STRUCTURE COMPRISING REINFORCING FIBERS AND THERMOPLASTIC ARAMID MATRIX FIBERS AND COMPOSITE MATERIAL MADE THEREFROM

[75] Inventors: Karl Heinrich, Grossaitingen; Hans-Joachim Brüning, Augsburg; Elke Gebauer, Bobingen, all of Germany

[73] Assignee: Hoechst Aktiengesellschaft, Germany

[21] Appl. No.: 236,671

[22] Filed: May 2, 1994

Related U.S. Application Data

[63] Continuation of Ser. No. 823,375, Jan. 21, 1992, abandoned.

[30] Foreign Application Priority Data

Jan. 22, 1991 [DE] Germany ............ 41 01 675.0

[51] Int. Cl.$^6$ ..................... D03D 3/00
[52] U.S. Cl. .............. 428/229; 428/260; 428/254; 428/272; 264/257; 66/202; 139/426 R; 139/420 A
[58] Field of Search ............... 428/229, 260, 428/272, 254; 264/257; 66/202; 139/426 R, 420 A

[56] References Cited

U.S. PATENT DOCUMENTS

| | | | |
|---|---|---|---|
| 4,847,354 | 7/1989 | Keil et al. | 528/340 |
| 4,908,264 | 3/1990 | Sikkema | 428/294 |
| 4,966,955 | 10/1990 | Cherdron et al. | 528/183 |
| 4,987,217 | 1/1991 | Keil et al. | 528/340 |
| 4,999,395 | 3/1991 | Croman et al. | 524/607 |
| 5,039,779 | 8/1991 | Cherdron et al. | 528/185 |

OTHER PUBLICATIONS

J. Pospisil, P. P. Klemchuk, CRC Press, vol. 1, pp. 122–126 (1990).

*Primary Examiner*—Christopher Raimund
*Attorney, Agent, or Firm*—Connolly and Hutz

[57] ABSTRACT

A textile sheet-like structure containing a combination of an inorganic or polymeric organic reinforcing fiber of high tenacity and high modulus of elasticity and a matrix fiber made from a fully fusible aramid is described. The semi-finished product can be employed for the production of fiber-reinforced composite materials.

21 Claims, No Drawings

TEXTILE SHEET-LIKE STRUCTURE COMPRISING REINFORCING FIBERS AND THERMOPLASTIC ARAMID MATRIX FIBERS AND COMPOSITE MATERIAL MADE THEREFROM

This is a continuation of our application Ser. No. 07/823,375, filed Jan. 21, 1992, now abandoned.

The present invention relates to a semi-finished product for the production of composite materials, to the composite materials produced therefrom, and to the use of this semi-finished product for the production of composite materials.

One way of producing fiber-reinforced plastics is appropriately to shape a thermoplastic and a reinforcing material, in each case in fiber form, and to melt the thermoplastic matrix fibers to form a composite material. This technique is described in detail, for example, in the paper by Geβner, Chemiefasern/Textilindustrie (Industrie-Textilien) [synthetic fibers/textiles industry (industrial textiles)], Vol. 39/91, T 185 ff, 1989. The two fibers can be mixed in the form of filaments and spun jointly, or mixed yarns are produced by interlacing and/or twisting. The mixing can furthermore take place in the sheet-like structure or multilayer materials can be formed from sheet-like structures comprising the thermoplastic fibers and sheet-like structures comprising the reinforcing fibers.

The reinforcing fibers selected are usually inorganic fibers, such as, for example, glass, carbon or boron fibers, but may also be high temperature-resistant synthetic fibers, such as, for example, aramid fibers or fibers made from aromatic polyesters. Examples of thermoplastic matrix fibers used are polyolefins, polyesters or polyether ketones. Combinations of reinforcing fibers with thermoplastic matrix materials have already been described in the prior art. Such combinations are disclosed, for example, in U.S. Pat. No. 4,925,729, EP-A-62 142, DE-A-3 925 266, DE-A-3 426 458 and DE-A-3 532 434. In addition to a very wide variety of thermoplastic matrix materials, these publications also propose aliphatic polyamides, for example nylon 6.

The use of aromatic polyamides as matrix materials has also already been described. Thus, for example, EP-A-321 735 describes a lightweight composite material which has a cavity-containing thermoplastic matrix into which reinforcing fibbers with a length of greater than 50 mm have been incorporated in a three-dimensional arrangement. The large number of possible materials proposed for building up the thermoplastic matrix also includes polyarylamides.

EP-A-307 993 discloses combinations of reinforcing fibers and specific thermoplastic aramids for the production of composite materials. It is stated that these combinations can be used to produce composite materials of high thermal and chemical stability. The description of EP-A-307 933 mentions various ways of combining the reinforcing fibers with the thermoplastic aramids before the actual production of the composite material, for example using reinforcing fibers together with films of thermoplastic aramid or using a combination of the two types of fiber.

The object of the present invention is to provide semi-finished products for the production of fiber-reinforced composite materials which have good processing properties and, for example, good drapability and in which the components in fiber form are thoroughly mixed so that the reinforcing fibers are enveloped as completely as possible on melting the matrix fibers.

This object is achieved by the semi-finished product as described herein and by the composite material, also described herein.

As a consequence of the virtually complete melting of the thermoplastic aramid fibers forming the matrix material, these fibers flow around and envelop fully the reinforcing fibers of high tenacity and high modulus of elasticity, so that the greatest possible contact area between the reinforcing fibers and the matrix material is formed. The reinforcing properties of the high-tenacity and high-modulus reinforcing fibers is thus utilized to the optimum, and composite materials having excellent mechanical and thermal properties are produced.

In the context of this description, the term "reinforcing fibers of high tenacity and high modulus of elasticity" is taken to mean fibers made from inorganic material or from organic polymers and having a fineness-based tenacity of greater than about 20 cN/dtex and an initial modulus (based on 100% elongation) of greater than about 30 GPa, preferably greater than 50 GPa.

In the context of this description, the term "textile sheet-like structure" is taken to mean woven fabrics of all types, knitted fabrics and structures which can be produced by a combination of various sheet-forming techniques, such as by weave/knit processes, in particular warp knitting, or multiaxial laid-filament fabrics, but also nonwoven textile sheet-like structures, such as fleece materials, rovings and filament warps, or by tufting. Common to all these sheet-like structures is the spatial proximity and the uniform mixing of reinforcing and matrix fibers, which simplifies melting of the matrix component and flow along the reinforcing fibers.

The textile sheet-like structures of the present invention are generally built up from yarns. For the purpose of this description, the term "yarn" is taken to mean multifilament yarns, staple fiber yarns, mixed yarns comprising multifilaments and staple fibers, and also monofilaments. For the purposes of this description, the term "fiber" is taken to mean both staple fibers and endless filaments.

Reinforcing fibers and matrix fibers can be in the form of separate yarns or in the form of mixed yarns. Furthermore, bicomponent fibers comprising reinforcing and matrix components can also be employed. The reinforcing fibers are preferably in the form of multifilaments in the yarns.

The textile sheet-like structures are very particularly preferably produced using mixed yarns comprising reinforcing and matrix fibers. These sheet-like structures are distinguished by particularly intimate mixing of the two types of fiber and can be melted under particularly gentle conditions to give composite materials. Furthermore, the mixing ratios in this embodiment can be set particularly precisely.

In a further preferred embodiment, the reinforcing and matrix fibers are employed in the form of bicomponent or multicomponent fibers, for example in the form of core/shell fibers, side/side fibers or matrix/fibril fibers. The matrix component here should be arranged so that at least part of this component is on the surface of these fibers.

Suitable reinforcing fibers are virtually any infusible or high temperature-fusible, high-modulus and high-tenacity fibers made from inorganic material or from organic polymers. These fibers are selected so that they do not yet melt or undergo virtually no thermoplastic deformation under the processing conditions suitable for the thermoplastic fiber components and are in the form of reinforcing fibers in the resultant composite material.

For the purpose of the present description, the term "aramid" or "aromatic polyamide" is taken to mean a polyamide which essentially contains aromatic radicals in the polymer chain, for example is built up from more than 80 mol % of aromatic monomer units.

The semi-finished product or composite material according to the invention can be produced using virtually any combination of high-tenacity and high-modulus reinforcing fibers with the selected aramid fibers made from thermoplastic aramid so long as the fibers forming the reinforcing material (=reinforcing fibers) have a higher melting or decomposition point than the fibers forming the matrix material (=matrix fibers), so that the matrix fibers can be melted virtually completely without the reinforcing fibers undergoing any significant change. The melting point of the matrix fibers is usually at least 10° C. below the melting or decomposition point of the reinforcing fibers, preferably more than 30° C. below the melting or decomposition point.

Suitable reinforcing fibers for the semi-finished product according to the invention or the composite material according to the invention are virtually any inorganic or organic polymeric fiber-forming materials which are suitable for this purpose.

Examples of preferred inorganic reinforcing fibers are boron fibers and in particular glass fibers and carbon fibers.

Examples of preferred organic polymeric materials are polyester fibers, in particular aromatic polyester, polyacrylonitrile and in particular aramid fibers. If aramids are used as the reinforcing and matrix fibers, a substantially homogeneous material is obtained with particularly good adhesion between the two components in the composite material. This embodiment is therefore particularly preferred.

The reinforcing fibers used can be fusible and preferably infusible fibers, in particular aramid fibers. The individual fiber titer of the reinforcing fibers can vary within broad limits, for example from 0.5 to 5 dtex.

Examples of preferred aramid fibers of very high tenacity and very high modulus are aramids built up essentially from p-aromatic radicals, such as poly(p-phenylene terephthalamide). Examples of these are the products KEVLAR® 29 and KEVLAR® 49 from Du Pont.

Examples of preferred aramid fibers of high tenacity and high modulus are aramids containing an essential proportion of aromatic m-compounds, such as poly(m-phenylene terephthalamide), poly(m-phenylene isophthalamide) and poly(p-phenylene isophthalamide). Examples of aramids of this type are the products NOMEX® from Du Pont. These aramids are insoluble in common solvents.

It is preferred to employ reinforcing fibers made from aramids which are soluble in organic solvents, in particular aramids which are soluble in polar aprotic solvents, such as dimethylformamide and dimethyl sulfoxide.

These include, for example, soluble aromatic polyamides based on terephthalic acid and 3-(p-aminophenoxy)-4-aminobenzanilide, as described in DE-A-21 44 126; and aromatic polyamides based on terephthalic acid, p-phenylenediamine and 3,4'-diaminodiphenyl ether, as described in DE-C-25 56 883 and in DE-A-30 07 063, and aromatic polyamides based on terephthalic acid and selected amounts of selected diamines, as described in DE-A-35 10 655, DE-A-36 05 394 and EP-A-199 090.

It is particularly preferred to use reinforcing fibers made from polyamides containing recurring structural units of various formulae, including —OC— Ar$^1$—CO— and —HN—Ar$^2$—NH— (and various other diamines), which polyamides are soluble in organic polyamide solvents.

Examples of the radicals Ar$^1$ and Ar$^2$ mentioned above are naphthalene-1,4-diyl and in particular p-phenylene; examples of R$^1$ and R$^2$ are methyl, methoxy and chlorine.

Such aramids are disclosed in EP-A-364 891, EP-A-364 892 and EP-A-364 893, and the content of these publications is likewise part of the present description.

Matrix fibers which can be employed are virtually all thermoplastic aramid fibers known per se, so long as these fibers can be melted virtually completely in textile sheet-like structures and can be shaped to form a matrix. The individual fiber titer of the matrix fibers can be varied within broad limits, for example from 0.5 to 5 dtex. Matrix fibers based on thermoplastic aromatic polyether-amides are preferably employed.

These include, for example, the aromatic copolyetheramides disclosed in DE-A-38 18 208 and DE-A-38 18 209.

It is furthermore possible to employ the aromatic polyamides disclosed in EP-A-366 316, EP-A-384 980, EP-A-384 981 and EP-A-384 984.

It is particularly preferred to employ matrix fibers made from thermoplastic aromatic copolyether-amines of the formula II

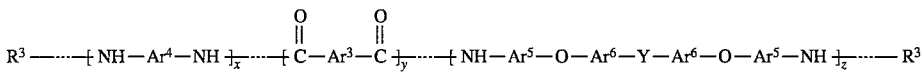

in which Ar$^3$ is a divalent, substituted or unsubstituted aromatic radical whose free valences are in the para- or meta-position or in a comparable parallel or angled position to one another, Ar$^4$ may have one of the meanings indicated for Ar$^3$ or is an —Ar$^7$—Z—Ar$^7$— group where Z is a —C(CH$_3$)$_2$— or —O—Ar$^7$—O— bridge and Ar$^7$ is a divalent aromatic radical, Ar$^5$ and Ar$^6$ are identical or different and are substituted or unsubstituted para- or meta-arylene radicals, Y is a —C(CH$_3$)$_2$—, —SO$_2$—, —S— or —C(CF$_3$)$_2$— bridge, where a) the polyether-amide has a mean molecular weight (number average) in the range from 5000 to 50,000, b) the molecular weight is controlled specifically by non-stoichiometric addition of the monomer units, where the total of the mole fractions x, y and z is one, the total of x and z is not equal to y, and x can adopt the value zero, and c) the ends of the polymer chain are blocked virtually completely by monofunctional radicals R$^3$ which do not react further in the polymer and, independently of one another, may be identical or different.

Matrix fibers based on these aramids are thermoplastic, have a particularly good melting behavior and result in composite materials having excellent strength.

Ar$^3$ may be a monocyclic or fused bicyclic, aromatic, divalent radical or a radical of the formula —Ar$^7$—Q—Ar$^7$— in which Ar$^7$ is as defined above, and Q is a direct C—C bond or an —O—, —CO—, —S—, —SO— or —SO$_2$— bridge.

Ar$^3$ may be a heterocyclic-aromatic or preferably a carbocyclic-aromatic radical.

Heterocyclic-aromatic radicals preferably contain one or two oxygen and/or sulfur and/or nitrogen atoms in the ring.

Ar$^5$ and Ar$^6$ are generally carbocyclic-aromatic arylene radicals whose free valences are in the para- or meta-position or in a comparable parallel or angled position to one another; they are preferably monocyclic aromatic radicals.

Ar$^7$ generally has one of the meanings defined for Ar$^5$ and Ar$^6$.

Examples of the radicals —Ar$^3$—, —Ar$^4$—, —Ar$^5$—, Ar$^6$— and —Ar$^7$— are p-phenylene, m-phenylene, biphenyl-4,4'-diyl and naphthalene-1,4-diyl.

Examples of substituents which may be on the radicals —Ar¹— to —Ar⁷— are branched or in particular straight-chain $C_1$–$C_6$-alkyl radicals, such as methyl, ethyl, n-propyl, isopropyl, n-butyl, n-pentyl or n-hexyl, and the corresponding perfluoro derivatives having up to six carbon atoms, or the corresponding alkoxy derivatives. Methyl is preferred.

Examples of halogen substituents are bromine and, in particular, chlorine.

The aromatic polyether-amides of the formula II which are preferably used according to the invention are prepared by specific molecular-weight control by non-stoichiometric addition of the monomer units, where the total of the mole fractions x, y and z is one, but the total of x and z cannot be equal to y, and x can adopt the value zero. In a preferred embodiment, z is greater than x.

When the polycondensation reaction is complete, the ends of the polymer chain are blocked completely by addition of monofunctional reagents which react in the polymer to form groups $R^3$ which do not react further. The terminal groups $R^3$ are independent of one another and may be identical or different and are preferably selected from groups of the formulae III, IV, V and/or VI

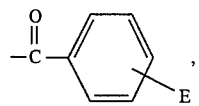 (III)

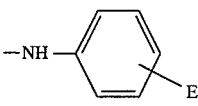 (IV)

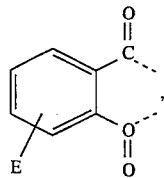 (V)

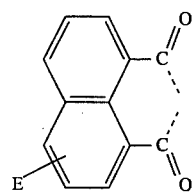 (VI)

In the case of terminal groups V and/or VI, the terminal nitrogen in the formula (II) is an imide nitrogen.

E in the abovementioned formulae is a hydrogen or halogen atom, in particular a chlorine, bromine or fluorine atom, or an organic radical, for example an aryl(oxy) group.

The aromatic polyether-amide of the formula II can be prepared by reacting one or more dicarboxylic acid derivatives with one or more diamines by the solution, precipitation or melt condensation process, in which one of the components is employed in less than the stoichiometric amount, and a chain terminator is added when the polycondensation is complete. It has been found that thermoplastic, aromatic polyether-amides having very good mechanical properties can be prepared by conventional techniques if a) the molecular weight is controlled specifically by using non-stoichiometric amounts of the monomers, b) the ends of the polymer chain are blocked completely by monofunctional compounds which do not react further in the polymer, and preferably c) the content of inorganic impurities in the polymer after work-up and isolation does not exceed 500 ppm.

The thermoplastic, aromatic polyamides of the formula II preferably employed according to the invention are furthermore distinguished by the fact that they have a mean molecular weight in the range from 5000 to 50,000 and a low melt viscosity of not more than 10,000 Pas.

The following compounds are suitable for the preparation of these preferred polyether-amides:

Dicarboxylic acid derivatives of the formula (VII)

 (VII)

in which $Ar^3$ is as defined above, and W may be a fluorine, chlorine, bromine or iodine atom, preferably a chlorine atom, or an —OH or $OR^4$ group where $R^4$ is a branched or unbranched, aliphatic or aromatic radical.

Examples of compounds of the formula (VII) are:
terephthalic acid
terephthaloyl dichloride
diphenyl terephthalate
isophthalic acid
diphenyl isophthalate
isophthaloyl chloride
phenoxyterephthalic acid
phenoxyterephthaloyl dichloride
diphenyl phenoxyterephthalate
di(n-hexoxy)terephthalic acid
bis(n-hexoxy)terephthaloyl dichloride
diphenyl bis(n-hexoxy)terephthalate
2,5-furandicarboxylic acid
2,5-furandicarbonyl chloride
diphenyl 2,5-furandicarboxylate
thiophenedicarboxylic acid
naphthalene-2,6-dicarboxylic acid
diphenyl ether 4,4'-dicarboxylic acid
benzophenone-4,4'-dicarboxylic acid
isopropylidene-4,4'-dibenzoic acid
diphenyl sulfone 4,4'-dicarboxylic acid
tetraphenylthiophenedicarboxylic acid
diphenyl sulfoxide 4,4'-dicarboxylic acid
diphenyl thioether 4,4'-dicarboxylic acid
trimethylphenylidenedicarboxylic acid.

Suitable aromatic diamines of the formula (VII)

 (VII)

in which $Ar^4$ is as defined above, are preferably the following compounds:
m-phenylenediamine
p-phenylenediamine
2,4-dichloro-p-phenylenediamine
diaminopyridine
bis(aminophenoxy)benzene
2,6-bis(aminophenoxy)pyridine
3,3'-dimethylbenzidine
4,4'- and 3,4'-diaminodiphenyl ether
isopropylidene-4,4'-dianiline
p,p'-and m,m'-bis(4-aminophenylisopropylidene)benzene
4,4'- and 3,3'-diaminobenzophenone
4,4'- and 3,3'-diaminodiphenyl sulfone
bis(2-amino-3-methylbenzo)thiophene S,S-dioxide.

Other suitable aromatic diamines are those of the formula (IX)

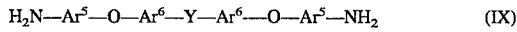 (IX)

in which $Ar^5$—$Ar^6$ and Y are as defined above.

Suitable aromatic diamines of the formula (IX) are:
2,2-bis[4-(3-trifluoromethyl-4-aminophenoxy)phenyl]propane bis[4-(4-aminophenoxy)phenyl] sulfide
bis[4-(3-aminophenoxy)phenyl] sulfide
bis[4(3-aminophenoxy)phenyl] sulfone
bis[4(4-aminophenoxy)phenyl] sulfone
2,2-bis[4-(4-aminophenoxy)phenyl]propane
2,2-bis[4-(3-aminophenoxy)phenyl]propane
2,2-bis[4-(2-aminophenoxy)phenyl]propane and
1,1,1,3,3,3-hexafluoro-2,2-bis[4-(4-aminophenoxy)phenyl] propane.

The polyether-amides employed according to the invention are preferably prepared by solution condensation processes.

The solution condensation of the aromatic dicarboxylic acid chloride with the aromatic diamines is carried out in aprotic, polar solvents of the amide type, such as, for example, N,N-dimethylacetamide, preferably in N-methyl-2-pyrrolidone. If desired, halide salts from the first and/or second group of the periodic table can be added to these solvents in a known manner in order to increase the solvency or to stabilize the polyether-amide solutions. Preferred additives are calcium chloride and/or lithium chloride. In a preferred embodiment, the condensation is carried out without added salt since the above-described aromatic polyether-amides have high solubility in the abovementioned solvents of the amide type.

The polyamides of the formula II preferably employed according to the invention allow thermoplastic processing by standard methods. They can be prepared if at least one of the starting components is employed in less than the stoichiometric amount. In this way it is possible to limit the molecular weight in accordance with the known Carother's equation:

$$P_n = \frac{1+q}{1-q}$$

in which $q \neq 1$ and simultaneously $1=y/x+z$.

$P_n$=degree of polymerization $q$=molar ratio between the diacid components and the amine components.

If less than the stoichiometric amount of acid dichloride is used, a monofunctional, aromatic acid chloride or acid anhydride, for example benzoyl chloride, fluorobenzoyl chloride, diphenylcarbonyl chloride, phenoxybenzoyl chloride, phthalic anhydride, naphthalic anhydride or Y-chloronaphthalic anhydride, is added as chain terminator at the end of the polymerization reaction.

Chain terminators of this type may be substituted, preferably by fluorine or chlorine atoms. Preference is given to benzoyl chloride or phthalic anhydride, and particular preference is given to benzoyl chloride.

If less than the stoichiometric amount of the diamine component is used, a monofunctional, preferably aromatic amine, for example fluoroaniline, chloroaniline, 4-aminodiphenylamine, aminodiphenylamine, aminodiphenyl ether, aminobenzophenone or aminoquinoline, is used as chain terminator at the end of the polycondensation.

In a particularly preferred embodiment of the polycondensation process, diacid chloride is polycondensed in less than the stoichiometric amount with diamine, and the reactive amino groups which remain are subsequently deactivated using a monofunctional acid chloride or diacid anhydride.

In a further preferred embodiment, the diacid chloride is employed in less than the stoichiometric amount and polycondensed with a diamine. A monofunctional, preferably aromatic, substituted or unsubstituted acid chloride or acid anhydride is subsequently used to deactivate the reactive amino terminal groups which remain.

The chain terminator, monofunctional amine or acid chloride or acid anhydride is preferably employed in a stoichiometric or superstoichiometric amount, based on the diacid or diamine component.

For the preparation of the aromatic polyamides preferably employed according to the invention, the molar ratio q (acid component to diamine component) can be varied in the range from 0.90 to 1.10, exact stoichiometry (q=1) of the bifunctional components being excluded. The molar ratio is particularly preferably in the range from 0.90 to 0.99 and from 1.01 to 1.10, particularly preferably in the range 0.93 to 0.98 and from 1.02 to 1.07, in particular in the range from 0.95 to 0.97 and from 1.03 to 1.05.

The polycondensation temperatures are usually between −20° and +120° C., preferably between +10° and +100° C. Particularly good results are achieved at reaction temperatures between +10° and +80° C. The polycondensation reactions are preferably carried out in such a manner that, after completion of the reaction, from 2 to 40% by weight, preferably from 5 to 30% by weight, of polycondensate is in the solution. For specific applications, the solution can, if required, be diluted with N-methyl-2-pyrrolidone or other solvents, for example DMF, DMAC or butylcellosolve, or concentrated under reduced pressure (thin-film evaporator).

When the polycondensation is complete, the hydrogen chloride formed and loosely bonded to the amide solvent is removed by adding acid-binding assistants. Suitable compounds for this purpose are, for example, lithium hydroxide, calcium hydroxide, but in particular calcium oxide, propylene oxide, ethylene oxide or ammonia. In a particular embodiment, the "acid-binding" agent used is pure water, which dilutes the hydrochloric acid and simultaneously serves to precipitate the polymer. To prepare the shaped structures in accordance with the present invention, the above-described copolyamide solutions according to the invention are filtered, degassed and converted in a manner known per se into aramid fibers or filaments.

If desired, suitable amounts of additives can also be added to the solutions. Examples are light stabilizers, antioxidants, flameproofing agents, antistatics, dyes, colored pigments or fillers.

In order to isolate the polyether-amide, a precipitant can be added to the solution and the coagulated product filtered off. Examples of typical precipitants are water, methanol and acetone, which may, if desired, also contain pH-controlling additives, such as, for example, ammonia or acetic acid.

The isolation is preferably carried out by comminuting the polymer solution in a cutting mill using an excess of water. The finely comminuted, coagulated polymer particles simplify the subsequent washing steps (removal of the secondary products formed from the hydrochloric acid) and the drying of the polymer (avoidance of inclusions) after filtration. In addition, subsequent comminution is superfluous since a free-flowing product is formed directly.

In addition to the solution condensation described, which is a readily available process, it is also possible, as stated above, to use other conventional processes for the preparation of polyamides, such as, for example, melt or solid condensation. These processes also, in addition to the condensation and the regulation of the molecular weight, contain purification or washing steps and the addition of suitable additives. In addition, the additives may also be added to the isolated polymer during thermoplastic processing.

The aromatic polyamides of the formula II preferably employed according to the invention have surprisingly good mechanical properties and high glass transition temperatures.

The Staudinger index $[\eta]_o$ is in the range from 0.4 to 1.5 dl/g, preferably in the range from 0.5 to 1.3 dl/g, particularly preferably in the range from 0.6 to 1.1 dl/g. The glass transition temperatures are generally above 180° C., preferably above 200° C., and the processing temperatures are in the range from 320° to 380° C., preferably in the range from 330° to 370° C., particularly preferably in the range from 340° to 360° C.

These polyamides can be processed by extrusion processes since the melt viscosities do not exceed 10,000 Pas. Extrusion can be carried out in conventional single- or twin-screw extruders.

The semi-finished products according to the invention can be produced by one of the known processes for the production of textile sheet-like structures. The titer of the reinforcing and/or matrix fiber yarns used is usually from 150 to 2500 dtex.

The thermoplastic matrix fibers can be introduced here in a substantially unoriented state. It is merely necessary for the tenacity and initial modulus of these fibers to be sufficient for the textile processing steps.

If mixed yarns comprising supporting and melting fibers are used, only minor demands are made of the matrix fibers, while in the case of mixed fabrics, for example made from supporting warp yarns and matrix yarns as the weft, correspondingly greater demands are made on the tenacity.

The respective mixing technique can be freely chosen in accordance with the requirements of the end product.

The weight per unit area of the semi-finished products according to the invention and the individual titers and staple lengths of the fiber types can be varied within broad limits and matched to the requirements of the area of application. Typical values for the weight per unit area of the semi-finished product are in the range from 50 to 500 g/m². The filaments or staple fibers building up the semi-finished products according to the invention can have any desired cross-sections, such as circular, dumbbell- or kidney-shaped, triangular or tri- or multi-lobal cross-sections. It is also possible to employ hollow fibers.

The advantage of the semi-finished product according to the invention is in the use of aromatic polyamides as the matrix fibers, i.e. the use of thermally and chemically very stable materials. The choice of the aromatic polyamides and their proportion in the semi-finished product, and the choice of the mixing technique gives a broad range of applications for the semi-finished product according to the invention.

The amount of matrix fibers is usually from 5 to 80% by volume, preferably from 30 to 70% by volume, in particular from 40 to 50% by volume, based on the total amount of matrix and reinforcing fibers.

The composite material according to the invention can be obtained from the semi-finished product by heating. This can take place with shaping and if desired with application of pressure. The processing temperature is selected so that the matrix fibers melt completely and are able to flow completely around the reinforcing fibers, so that a homogeneous matrix is formed which wets the reinforcing fibers as thoroughly as possible. If desired, the reinforcing fibers can, during melting of the matrix fibers, be oriented by tension, for example during filament winding or during tape winding.

Embodiments of the semi-finished product in which the reinforcing fibers are substantially aligned unidirectionally are also possible.

The composite materials obtainable in this way can be employed, for example, in areas where high strength, temperature resistance and chemicals resistance are required. Examples of these are use in aerospace technology or in apparatus construction.

We claim:

1. A semi-finished product for the production of composite materials comprising reinforcing fibers and matrix fibers, said reinforcing fibers comprising at least one of inorganic material and organic polymers, wherein the semi-finished product is in the form of a textile sheet-like structure, wherein the reinforcing fibers employed have high tenacity and a high modulus of elasticity, and wherein said matrix fibers comprise aromatic polyether-amides of the formula II

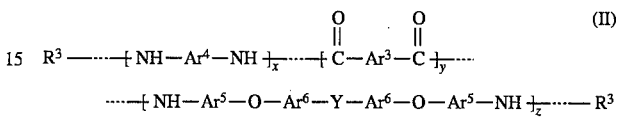

in which $Ar^3$ is a divalent, substituted or unsubstituted aromatic radical whose free valences are in the para- or meta-position or in a comparable parallel or angled position to one another, $Ar^4$ has one of the meanings indicated for $Ar^3$ or is an $-Ar^7-Z-Ar^7-$ group where Z is a $-C(CH_3)_2-$ or $-O-Ar^7-O-$ bridge and $Ar^7$ is a divalent aromatic radical, $Ar^5$ and $Ar^6$ are identical or different and are substituted or unsubstituted para- or meta-arylene radicals, Y is a $-C(CH_3)_2-$, $-S-$ or $-C(CF_3)_2-$ bridge, where a) the polyether-amide has a mean molecular weight (number average) in the range from 5000 to 50,000, b) the molecular weight is controlled specifically by non-stoichiometric addition of the monomer units, where the total of the mole fractions x, y and z is one, the total of x and z is not equal to y, and x can adopt the value zero, and c) the ends of the polymer chain are blocked substantially completely by monofunctional radicals $R^3$ which do not react further in the polymer and, independently of one another, are identical or different.

2. A semi-finished product as claimed in claim 1, wherein the reinforcing fibers have an initial modulus of greater than 50 GPa.

3. A semi-finished product as claimed in claim 1, wherein the reinforcing and matrix fibers are in the form of mixed yarns.

4. A semi-finished product as claimed in claim 1, wherein the reinforcing and matrix fibers are in the form of bicomponent or multicomponent fibers comprising matrix component and reinforcing component, and further wherein at least some of the matrix component is on the surface of the bicomponent or multicomponent fibers.

5. A semi-finished product as claimed in claim 1, wherein said reinforcing fibers comprise aromatic polyamides, aromatic polyesters or polyacrylonitrile.

6. A semi-finished product as claimed in claim 5, wherein said reinforcing fibers comprise non-thermoplastic aramids.

7. A semi-finished product as claimed in claim 1, wherein said reinforcing fibers comprise inorganic materials.

8. A semi-finished product as claimed in claim 1, wherein the textile sheet-like structure is a knitted fabric.

9. A semi-finished product as claimed in claim 2, wherein the textile sheet-like structure is a knitted fabric.

10. A semi-finished product as claimed in claim 6, wherein the reinforcing fibers are fibers made from aramids which are soluble in organic solvents and contain at least 95 mol%, based on the polyamide, of recurring structural units of the formulae Ia, Ib, Ic and Id $$-OC-Ar^1-CO- \quad (Ia)$$

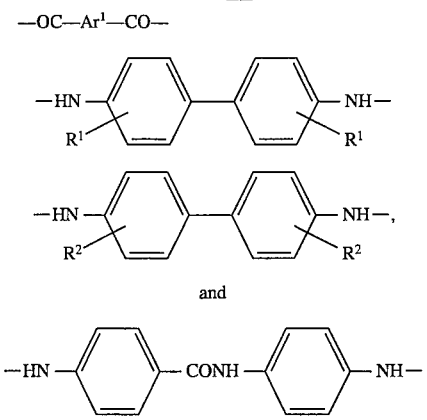

and up to 5 mol% of at least one structural unit selected from structural units (Ie) and (If) containing m-bonds and derived from at least one of aromatic dicarboxylic acids and aromatic diamines, the total of the molar proportions of the structural units (Ia)+(Ie) and the molar proportions of the structural units (Ib)+(Ic)+(Id)+(If) being essentially the same, and the ratio between the amounts of the diamine components (Ib), (Ic) and (Id) and the total amount of these diamine components being within the following limits:

| Structural unit (Ib): | 30–55 mol % |
|---|---|
| Structural unit (Ic): | 15–35 mol % |
| Structural unit (Id): | 20–40 mol %, | where

—$Ar^1$— is a divalent aromatic radical whose valence bonds are in the para- or comparable coaxial or parallel positions, but may be substituted by one or two inert radicals, such as alkyl, alkoxy or halogen, and where —$R^1$ and —$R^2$ are different from one another and are lower alkyl radicals or lower alkoxy radicals or halogen atoms.

11. A semi-finished product as claimed in claim 6, wherein the reinforcing fibers are fibers made from aramids which are soluble in organic solvents and contain at least 95 mol%, based on the polyamide, of recurring structural units of the formulae Ia, Ig, Ib and Id $$-OC-Ar^1-CO- \quad (Ia)$$

$$-HN-Ar^2-NH- \quad (Ig)$$

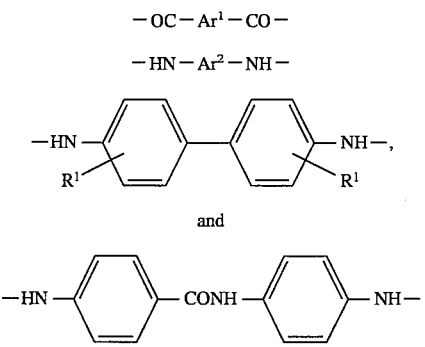

and up to 5 mol% of at least one structural unit selected from structural units (Ie) and (If) containing m-bonds and derived from at least one of aromatic dicarboxylic acids and aromatic diamines, the total of the molar proportions of the structural units (Ia)+(Ie) and the molar proportions of the structural units (Ig)+(Ib)+(Id)+(If) being essentially the same, and the ratio between the amounts of the diamine components (Ig), (Ib) and (Id) and the total amount of these diamine components being within the following limits:

| Structural unit (Ig): | 15–25 mol % |
|---|---|
| Structural unit (Ib): | 45–65 mol % |
| Structural unit (Id): | 15–35 mol %, | where —$Ar^1$— and —$R^1$ are as defined in claim 10, and —$Ar^2$— has one of the meanings defined for —$Ar^1$—.

12. A semi-finished product as claimed in claim 6, wherein the reinforcing fibers are fibers comprising aramids which are soluble in organic solvents and contain at least 95 mol%, based on the polyamide, of recurring structural units of the formulae Ia, Ig, Ib and Ic $$-OC-Ar^1-CO- \quad (Ia)$$

$$-HN-Ar^2-NH- \quad (Ig)$$

and up to 5 mol% of at least one structural unit selected from structural units (Ie) and (If) containing m-bonds and derived from at least one of aromatic dicarboxylic acids and aromatic diamines, the total of the molar proportions of the structural units (Ia)+(Ie) and the molar proportions of the structural units (Ig)+(Ib)+(Ic)+(If) being essentially the same, and the ratio between the amounts of the diamine components (Ig), (Ib) and (Ic) and the total amount of these diamine components being within the following limits:

| Structural unit (Ig): | 20–30 mol % |
|---|---|
| Structural unit (Ib): | 35–55 mol % |
| Structural unit (Ic): | 15–40 mol %, | where —$Ar^1$— and —$R^1$ are as defined in claim 10, and —$Ar^2$— is as defined in claim 11.

13. A composite material obtained by heating a semi-finished product as claimed in claim 1, optionally under pressure, so that the matrix fibers melt and flow around the reinforcing fibers to form a matrix which bonds together the reinforcing fibers.

14. A method for the production of composite materials wherein the semi-finished product of claim 1 is heated until the matrix fibers melt completely and flow completely around the reinforcing fibers so that a homogenous matrix is formed which contains the reinforcing fibers.

15. A semi-finished product as claimed in claim 7, wherein said inorganic materials comprise at least one material selected from the group consisting of boron fibers, carbon fibers and glass fibers.

16. A semi-finished product as claimed in claim 1, wherein said textile sheet-like structure is selected from the group consisting of woven fabrics and warp-knit fabrics.

17. A semi-finished product as claimed in claim 2, wherein said textile sheet-like structure is selected from the group consisting of woven fabrics and warp-knit fabrics.

18. A semi-finished product as claimed in claim 1, wherein:

in said polyetheramide of formula II the mole ratio of said mole fraction y to the sum of said mole fractions x+z, which is the ratio of diacid-derived units to amine-derived units, is in the range of 0.93 to 0.98 or in the range of 1.02 to 1.07, the residual active amino groups or diacid groups having been deactivated with monofunctional material.

19. A semi-finished product for the production of composite materials, said semi-finished product being in the form of a textile sheet-like structure comprising aramid reinforcing fibers, the aramid being soluble in organic solvents, and fully fusible aromatic polyamide matrix fibers, wherein the matrix fibers consist essentially of an aromatic polyether-amide of the formula II

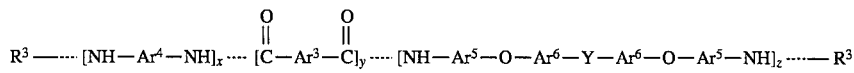
(II)

in which $Ar^3$ is a divalent, substituted or unsubstituted aromatic radical whose free valences are in the para- or meta-position or in a comparable parallel or angled position to one another, $Ar^4$ may have one of the meanings indicated for $Ar^3$ or is an —$Ar^7$—Z—$Ar^7$— group where Z is a —C(CH$_3$)$_2$— or —O—$Ar^7$—O— bridge and $Ar^7$ is a divalent aromatic radical, $Ar^5$ and $Ar^6$ are identical or different and are substituted or unsubstituted para- or meta-arylene radicals, Y is a —C(CH$_3$)$_2$—, —S— or —C(CF$_3$)$_2$— bridge, where a) the polyether-amide has a mean molecular weight (number average) in the range from 5000 to 50,000, b) the molecular weight is controlled specifically by non-stoichiometric addition of the monomer units, where the total of the mole fractions x, y and z is one, the total of x and z is not equal to y, and x can adopt the value zero, c) the ends of the polymer chain are blocked substantially completely by monofunctional radicals $R^3$ which do not react further in the polymer and, independently of one another, can be identical or different and d) the polyether-amide, in the molten state, has a melt viscosity not exceeding about 10,000 Pas.

20. A semi-finished product as claimed in claim 19, wherein said reinforcing fibers are made from aramids which are soluble in polar aprotic solvents.

21. A semi-finished product as claimed in claim 19, wherein:

said polyetheramide of said formula II comprises less than a stoichiometric amount of the mole fraction y with respect to the total of mole fractions x and z, the residual active amino groups of mole fractions x and z having been deactivated with monofunctional acid halide or diacid dianhydride.

* * * * *